Sept. 12, 1944.   G. LOWKRANTZ   2,358,018
AVIATION TRAINER
Filed June 29, 1942

INVENTOR.
GUNNE LOWKRANTZ
BY Donald T. Hillier
ATTORNEY

Patented Sept. 12, 1944

2,358,018

UNITED STATES PATENT OFFICE 2,358,018

AVIATION TRAINER

Gunne Lowkrantz, Binghamton, N. Y., assignor to Link Aviation Devices, Inc., Binghamton, N. Y., a corporation of New York Application June 29, 1942, Serial No. 448,905

30 Claims. (Cl. 35—12)

This invention relates to trainers for aviators and comprises means for improving the functioning of the instruments in a grounded trainer.

This invention has been found to be particularly useful and will be described in connection with an aviation trainer which constitutes essentially a simulated aircraft fuselage mounted upon a universal joint whereby the trainer can be turned, pitched and banked in simulation of a plane in flight. Such a trainer is disclosed in U. S. Patent 1,825,462. United States Patent 2,099,857 discloses means whereby the functioning of certain of the instruments in an airplane such as the altimeter, vertical speed indicator, and air speed indicator may be simulated in such a trainer.

One of the principal objects of this invention is to provide, in such a trainer, means to be used in connection with the instruments described in the above-mentioned U. S. Patent 2,099,857 whereby the rate of climb or vertical speed indicator and altimeter may be made to respond more closely in simulation of the functioning of the corresponding instruments in a real plane in flight.

Another principal object of this invention is to provide means which will not permit damage to the vertical speed indicator and altimeter whenever the climb or dive valve in the trainer is opened in the presence of a high or low pressure in the equalizer tank which forms a part of the instrument control mechanism.

Another principal object of this invention is to incorporate in the instrument system of such a trainer means to maintain a constant differential within predetermined limits across the ports of the "climb" and "dive" valves at all times when the system is in operation.

Other objects and advantages will become apparent as the description proceeds, reference now being made to the accompanying drawing forming a part of this application and wherein like reference numerals indicate like parts.

Figures 1, 2:
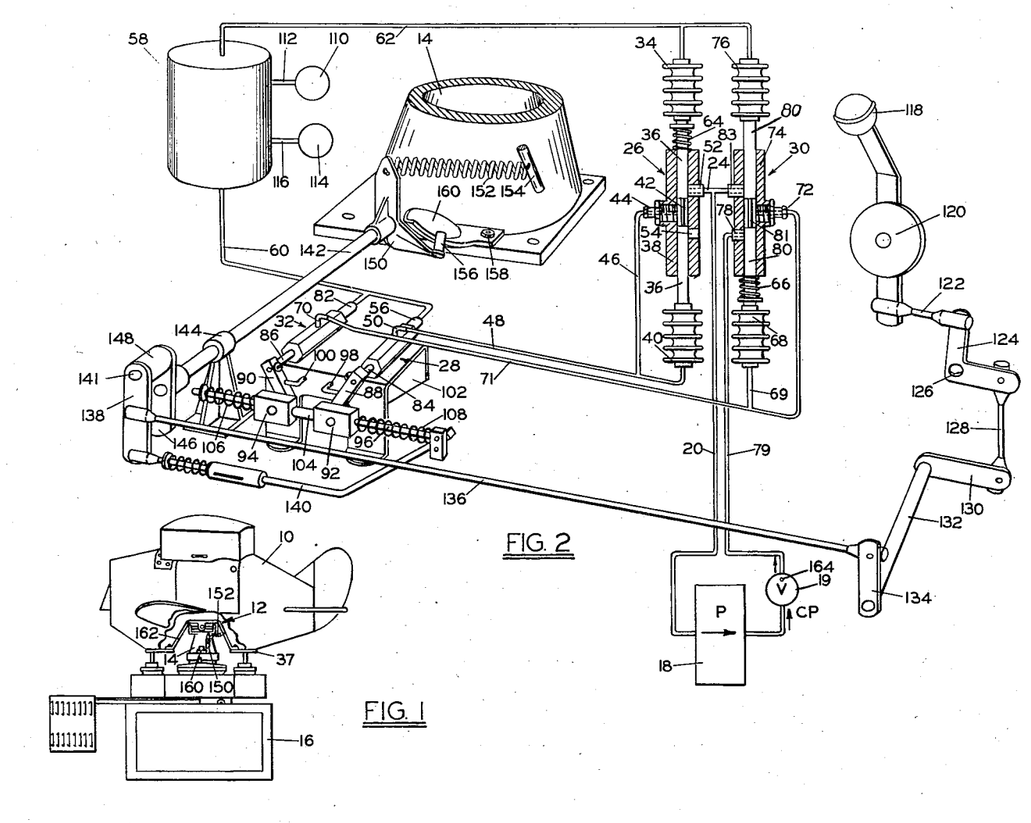
Fig. 1 is a side view of a trainer in which this invention is particularly useful, certain parts being cut away for purposes of illustration.
Fig. 2 is a diagrammatic illustration of a preferred embodiment of the present invention shown in relation to certain of the parts of such a trainer.

Referring to Fig. 1, it will be seen that such a trainer comprises a fuselage 10 mounted upon a universal joint designated generally as 12 which in turn rests upon a central supporting member 14. The central supporting member 14 is rotatably supported in base 16. The universal joint 12 and the rotatable mounting of central support 14 in base 16 make it possible for the student in the trainer, by a manipulation of the controls in said trainer, to pitch and bank said trainer fuselage to any desired position as well as turn the fuselage about its vertical axis. Inasmuch as the base 16 at all times remains stationary the trainer makes no forward or vertical movements. The means for accomplishing the movements of the trainer fuselage 10 are completely disclosed in the two above-mentioned United States patents and, therefore, form no part of the present invention except in combination with the detailed means to be described hereinafter.

It will be realized that in an airplane there is provided an altimeter which indicates the height of the plane above some point on the earth's surface as well as a rate of climb or vertical speed indicator which shows at any given instant whether the plane is gaining or losing altitude, or whether it is in level flight. In the event that the plane is not in level flight, the rate of change of the altitude of the plane is shown by the vertical speed indicator. These two instruments in a real plane are responsive to the pressure of the atmosphere which surrounds them, the altimeter being responsive to the absolute pressure and therefore indicating the height of the plane above some point on the earth's surface, and the vertical speed indicator, being responsive to the rate of change of the pressure of the atmosphere surrounding it, therefore shows the rate of change of the altitude of the plane.

The altimeter in a plane has an indicating hand which moves across the dial a distance proportional to the change in atmospheric pressure, and hence, proportional to the change in the altitude of the ship. The vertical speed indicator has a hand which remains in the horizontal position when the atmospheric pressure is constant, thus indicating that the plane is in level flight, this hand moving upward when the atmospheric pressure is decreasing, and moving downward when the atmospheric pressure is increasing, thus indicating that the plane is gaining or losing altitude, respectively.

As before stated, the trainer of the type before mentioned, although it be in a climbing or diving attitude does not actually gain or lose altitude. Nevertheless, it has been found advantageous to install in the trainer an altimeter and a vertical speed indicator to indicate the assumed trainer altitude and assumed rate of change of trainer altitude. In order that these instruments in the trainer will properly show the assumed trainer altitude and assumed rate of change of such altitude, an equalizer tank has been installed in the trainer. The altimeter and vertical speed indicator are connected to this tank and by causing the pressure within this tank to change according to the assumed trainer altitude in the same manner that the atmospheric pressure around a plane in flight changes as the altitude of the plane changes, the altimeter and vertical speed indicator in the trainer will show the assumed trainer altitude and assumed rate of change thereof. This tank, as shown in U. S. Patent 2,099,857, never has more than the prevailing atmospheric pressure therein, and whenever the trainer is "flying" at an altitude above that represented by a pressure within the tank equal to atmospheric, the pressure within the tank is less than atmospheric.

Inasmuch as the altitude of a plane at a given moment depends upon the successive attitudes and throttle positions thereof as well as the length of time that the plane has maintained its successive attitudes and throttle settings since the takeoff, the pressure within the tank in the trainer at a given moment is also made to depend upon these same factors in the trainer. If the trainer assumes a climbing attitude, the throttle setting remaining constant, the pressure within the tank decreases, the total decrease depending upon the angle of climb and the length of time the trainer remains in its climbing position. The total decrease in pressure within the tank affects the altimeter which gives the assumed altitude of the trainer. The rate of decrease at any given moment, throttle setting not considered, will depend upon the attitude of the trainer, and the vertical speed indicator will respond to this factor. Of course, if the trainer assumes a diving attitude the pressure within the tank is built up according to the same rules and the instruments respond accordingly.

Also, if the throttle in the trainer is opened, the trainer attitude remaining constant, the pressure within the tank is decreased, the total decrease depending upon the amount of the opening of the throttle as well as the length of time that the throttle remains open. The rate of change depends upon the amount that the throttle is opened. The altimeter and vertical speed indicator will respond appropriately.

The changing of the pressure within the tank in response to a change in the attitude of the trainer or to a change in the throttle setting thereof, thereby causing a change in the readings of the altimeter and vertical speed indicator, is described in detail and claimed in the above-mentioned United States Patent 2,099,857. However, in the said patent, if the pressure within the tank were relatively high, and therefore, the trainer were assumed to be flying at a relatively low altitude, the placing of the trainer in a climbing position or the opening of the throttle would cause a rapid decrease in the pressure within the tank and the altimeter and vertical speed indicator would respond excessively as compared with the responses of the corresponding instruments in a real plane to corresponding changes in throttle position or attitude. On the other hand, if the pressure within the tank were relatively low, and therefore, the trainer were assumed to be flying at a relatively high altitude, a change of the trainer to a diving attitude or a closing of the throttle would cause a great amount of air to enter the tank and again excessive instrument indications would result.

It is, therefore, a principal object of this invention to provide means whereby the rate of change of pressure in the equalizer tank caused by a change in the attitude of the trainer or in the throttle setting thereof will at all times be such that the vertical speed indicator and altimeter will react to such change in the same manner that the instruments of the same name in a real plane would react to a corresponding change in the attitude of the ship or throttle setting therein.

Referring to Fig. 2, vacuum pump 18 is connected by means of tube 20 to duct 24, the left end of which is in communication with the pressure regulator designated generally as 26, which pressure regulator is associated with the climb valve which is designated generally as 28. The right end of duct 24 is in communication with the pressure regulator designated generally by 30, and this pressure regulator is associated with the dive valve which in turn is designated generally by the numeral 32.

Pressure regulator 26 has at one end an expansible metal bellows 34, the upper end of which as viewed in Fig. 2 is rigidly affixed to a suitable frame member (not shown) which supports the pressure regulators 26 and 30. The lower end of the bellows 34 has affixed thereto a reciprocable shaft 36 which is free to move back and forth in the housing 38, which housing is rigidly mounted upon the frame member just mentioned. The lower end of shaft 36, as seen in Fig. 2, is rigidly affixed to the upper end of bellows 40 which is exactly like bellows 34, and the lower end of bellows 40 is also rigidly affixed to said frame member. It will be noticed that the central part 42 of reciprocable shaft 36 is greatly reduced in diameter to form a valve. Housing 38, which housing completely surrounds shaft 36, has a central port 44 and when said shaft 36 is in its central position, port 44 is in communication with the space around the reduced central portion 42 of shaft 36. Port 44 of housing 38 communicates with the port 50 of the climb valve 28 and with bellows 40 by means of connections 46 and 48. Bellows 40 and port 50, it will be seen, are also connected.

Slightly above port 44 in housing 38 is the port 52 which communicates with previously mentioned duct 24 and on the opposite side of port 44 is a third port 54 which is in communication with the atmosphere.

When reciprocable shaft 36 is in its central position port 44 is not in communication with either port 52 which leads to the source of reduced air pressure 18 or with port 54 which leads to the atmosphere. However, in the event that reciprocable shaft 36 is moved toward the bellows 34, port 44, by virtue of the central valve 42, will communicate with port 52 which leads to the source of reduced air pressure, but port 44 will not communicate with the port 54 which leads to the atmosphere. In the event that member 36 moves in the opposite direction, port 44 will communicate with atmospheric port 54 but will not communicate with reduced air pressure port 52. It will be realized, therefore, that the position of reciprocable member 36 determines whether the port 44, and consequently whether bellows 40 and port 50 of climb valve 28, is in communication with reduced air pressure port 52, atmospheric port 54, or neither of them.

As shown in Fig. 2, the second port 56 of climb valve 28 communicates with equalizer tank 58 by means of connection 60 and equalizer tank 58 is connected to bellows 34 by means of tube 62. Spring 64 encircles the upper end of reciprocable member 36 and is interposed between the upper end of housing 38 and the lower end of bellows 34.

Because of the aforedescribed arrangement, the pressure within equalizer tank 58 is at all times equal to that present in the port 56 of climb valve 28 and is also equal at all times to that present in bellows 34. The pressure within bellows 40 is at all times equal to that present in the port 50 of climb valve 28. Assuming that the pressure within equalizer tank 58 and hence the pressure within port 56 and bellows 34 is less than or equal to the pressure within bellows 40 and hence port 50, the compression of spring 64 will collapse bellows 34 thereby causing reciprocable member 36 to move toward bellows 34 allowing communication between port 44 and reduced airport 52. Vacuum pump 18 will therefore, through tube 20, duct 24, port 52, valve 42, port 44, and connections 46 and 48, be in communication with bellows 40 and, consequently, the pressure within bellows 40 will be reduced. This reduction of pressure within bellows 40 will tend to collapse that bellows and this reduction will continue until the pressure within bellows 40 and port 50 is less than the pressure within bellows 34 (and therefore within tank 58 and port 56) by an amount equal to the compression of spring 64. When this point is reached, it will be realized that the central valve 42 of reciprocable shaft 36 will have returned to its central position and the port 44 will no longer be in communication with reduced air port 52, nor will it communicate with atmospheric port 54. When this condition is realized, inasmuch as the pressure within bellows 40 is less than the pressure within bellows 34 by the amount of the compression of spring 64, the pressure in port 50 of climb valve 28 is less than the pressure in port 56 of climb valve 28 by the same amount.

The pressure within bellows 34, on the other hand, can never remain more than the pressure within bellows 40 by an amount greater than the compression of spring 64 because such a condition would force reciprocable shaft 36 past its central position toward bellows 40, thereby allowing communication between port 44 and atmospheric port 54. Atmosphere would therefore enter bellows 40 through tube 46 until the pressure within bellows 40 becomes less than the pressure within bellows 34 by an amount only equal to the compression upon spring 64. When this point is reached, reciprocable shaft 36 would again be in its central position.

It is therefore clear that whenever climb valve 28 is closed, regulator 26 will place across the ports 56 and 50 of climb valve 28 a differential equal to the compression of spring 64.

Regulator 30 which regulates the pressure across the ports of dive valve 32 is of the same general type as the regulator 26 which has just been described, except spring 66 of the dive regulator 30 is on the opposite end of regulator 30. It will be noticed in Fig. 2 that bellows 68 of regulator 30 is connected to the port 70 of dive valve 32 by means of connections 69 and 71, and this same bellows is connected by means of the other end of member 71 to the central port 72 of the housing 74 of regulator 30. The other bellows 76 of regulator 30 is connected by means of tube 62 to the equalizer tank 58. The second port 78 of housing 74 is connected to the output of vacuum pump 18 by means of tube 79. Relief valve 19 controls the flow of air from the output of pump 18 to port 78. This valve may be of any suitable type provided it allows to pass into port 78 a pressure constantly above atmospheric slightly in excess of the compression of spring 66. All pressure above this amount is allowed by this valve to pass into the atmosphere. The third port 83 of regulator 30 is connected to duct 24 which, as explained before, is connected to vacuum pump 18 by means of tube 20. The lower end of bellows 76 is attached to the upper end of shaft 80 which is reciprocable within housing 74, shaft 80 being turned down as shown to form the valve 81. The lower end of shaft 80 is affixed to the upper end of bellows 68.

Assuming the pressure within bellows 68 to be equal to or less than the pressure within bellows 76, spring 66 will collapse bellows 68 and reciprocable member 80 will be drawn toward bellows 68, valve 81 will allow communication between ports 72 and 78 and, therefore, the pressure of the output of vacuum pump 18 which is allowed by valve 19 to pass into port 78 will enter bellows 68 by means of connections 71 and 69 until the pressure within this bellows is greater than the pressure within bellows 76 by an amount equal to the compression of spring 66. At this time, reciprocable member 80 will have returned to its central position.

The pressure within bellows 68 can never remain more than the pressure within bellows 76 by an amount greater than the compression upon spring 66 because such a condition would force reciprocable shaft 80 from its central position toward bellows 76 thereby permitting communication between ports 83 and 72. Reduced air pressure would therefore be applied to bellows 68 until the pressure within that bellows is reduced to the point where it exceeded the pressure within bellows 76 by an amount equal to the compression of spring 66. When this point is reached, reciprocable shaft 80 would again be in its central position.

Therefore, the pressure within bellows 68 always becomes greater than the pressure within bellows 76 by the amount of the compression of spring 66. Inasmuch as the pressure within bellows 76 is equal to the pressure within equalizer tank 58 and to the pressure within port 82 of dive valve 32, while the pressure within bellows 68 is always equal to the pressure within port 70 of dive valve 32, it will be realized that the pressure differential between the two ports 70 and 82 of the dive valve 32 will always be equal to the compression of spring 66.

The detailed construction of the climb valve 28 and the dive valve 32 forms no part of the present invention and for a detailed description thereof reference is made to the above-mentioned U. S. Patent 2,099,857. In order to understand the instant invention, it is sufficient to know that each of the valves 28 and 32 is a needle valve, in the case of the climb valve 28 the needle and seat being between the port 56 leading to equalizer tank 58 and the port 50 leading to bellows 40, while in the case of dive valve 32 the needle and seat are between the port 82 leading to equalizer tank 58 and port 70 which leads to bellows 68. Connected integrally with the needles in each of the valves is a threaded stem, the outer ends of which are designated by the differential pressure being at all times equal to the compression upon spring 64 and not affected by any change in the pressure differential between the equalizer tank 58 and pump 18.

On the other hand, if the throttle in a plane is closed, it is well known that the altitude of the ship becomes lower, and the altimeter will reflect this decreased altitude while the vertical speed indicator will show the fact of descent and rate thereof. It will be realized that a movement to the right in Fig. 2 of throttle 118 will cause link 136, the lower end of arm 138, member 140 and reciprocable member 96 to move to the left in Fig. 2. This movement, as explained above, will not affect climb valve 28 but will cause dive valve 32 to open, thereby allowing communication between equalizer tank 58 and bellows 68 by means of connection 60 and ports 82 and 70. As the pressure in bellows 68 and port 70 is at all times greater than the pressure within bellows 76, equalizer tank 58, and port 82 by an amount equal to the compression upon spring 66, whenever dive valve 32 is opened by movement to the left in Fig. 2 of reciprocable member 96, which movement may be caused by a closing of throttle 118, air will flow from bellows 68 through connections 69 and 71, ports 70 and 82 of dive valve 32 and connection 60 into equalizer tank 58. Altimeter 114 will reflect a decrease in the assumed trainer altitude while vertical speed indicator 110 will show the fact of assumed descent and rate thereof.

This flow of air from bellows 68 into equalizer tank 58 and therefore into bellows 76 will cause a contraction of bellows 68 and an expansion of bellows 76, and therefore, reciprocable member 80 of dive regulator 30 will move towards bellows 68. This movement will allow communication between port 72 and pressure port 78 and, therefore, air from the output of vacuum pump 18 will flow through tube 79 into bellows 68, causing the same to expand. Air will continue to flow into bellows 68 until the pressure within that bellows is again higher than the pressure within bellows 76 and equalizer tank 58 by an amount equal to the compression upon spring 66. When this point is reached, as much air will flow through pressure port 78 and into bellows 68 as is exhausted from this bellows through dive valve 32 by equalizer tank 58.

Therefore, it will be realized that whenever the assumed altitude of the trainer is decreasing because of a closed throttle position the differential pressure across the ports of the dive valve 32 will at all times remain constant regardless of the differential between valve 19 and tank 58.

Whenever a plane in flight changes its attitude, that is, its angle of climb or dive, a change in the altitude of the plane results, the altimeter reflecting this change and the vertical speed indicator showing the direction of the change and the rate thereof. The following means are incorporated in my invention to simulate these instrument responses.

As seen in Fig. 2, horizontal shaft 142 is mounted for rotation in brackets 144, only one of which is shown, which brackets are fixedly attached to the bottom 37 of the trainer fuselage 10. The left end of shaft 142 has rigidly affixed thereto arm 146 and to the upper end of this arm is rigidly affixed stub shaft 148. To the left end of stub shaft 148, as before stated, is pivotally attached at the point 141 the upper end of arm 138. The end of shaft 142 nearer universal joint 12 has rigidly affixed thereto a lever 150 which is referred to in the art as the pitch action take-off lever, the upper end of which has connected thereto one end of a spring 152. The other end of spring 152 is connected to member 154 which at all times remains stationary. The lower end of lever 150 has suitably attached thereto a roller 156, and rigidly affixed to the central support 14 of the trainer by means of bolts 158 is an upwardly extending member 160, referred to in the art as the pitch action cam.

As shown in Fig. 1, the weight of the trainer fuselage 10 rests upon the top of universal joint 12 by means of brackets 162, even though the bottom 37 of the fuselage is below the universal joint 12. The complete mechanism shown in Fig. 2 except central support 14, stud 154, spring 152 and cam 160 rests upon the bottom of the trainer fuselage. Because of the fact that the mechanism shown in Fig. 2, except as just stated, is suspended below universal joint 12 and at the same time it rests upon this universal joint, it will be understood that when the trainer fuselage 10 pitches in simulation of climbing, shaft 142 moves ahead of its level flight position but roller 156 and the lower part of lever 150 cannot so move because of cam 160. Shaft 142 will therefore turn in brackets 144 in a counterclockwise direction as viewed from the left side of the trainer fuselage. Stub shaft 148 will therefore be moved toward the front of the trainer by the turning of arm 146, and arm 138 will pivot about the point where link 136 is attached to it. The lower end of arm 138 will therefore move to the rear or to the right in Fig. 2 as will member 140 and reciprocable member 96. This will cause climb valve 28 to open but the position of dive valve 32 will remain the same.

Inasmuch as it has been demonstrated that whenever climb valve 28 is opened by virtue of a movement of throttle 118 climb regulator 26 at all times maintains across the two ports of climb valve 28 a constant differential equal to the compression upon spring 64, it is deemed unnecessary to demonstrate that regulator 26 performs the same function whenever climb valve 28 is opened through a change in the attitude of the trainer because, as seen in Fig. 2, climb valve 28 is always opened by a movement of reciprocable member 96.

Whenever the trainer is pitched in simulation of a dive, shaft 142 will be moved to the rear of its level flight position and because spring 152 will maintain roller 156 against cam 160, shaft 142 will be made to turn in brackets 144 in a direction to cause stub shaft 148 to move toward the rear of the trainer. The lower end of arm 138 will therefore be moved toward the head of the trainer as will member 140 and reciprocable member 96, thus causing dive valve 32 to open, climb valve 28 remaining in the closed position. Inasmuch as it has also been shown that whenever dive valve 32 is opened through a movement of throttle 118, dive regulator 30 at all times maintains across the two ports of dive valve 32 a constant differential pressure equal to the compression of spring 66, it is deemed unnecessary to show that when dive valve 32 is opened by a change in the trainer attitude, pressure regulator 30 will perform the same function.

From the preceding disclosure, it will be realized that the pressure within equalizer tank 58 will be governed by the setting of throttle 118 and by the attitude of the trainer fuselage 10.

An opening of the throttle and/or a climbing attitude of the fuselage results in a decrease in the pressure within tank 58, while opposite movements of these two controlling elements results in an increase in the pressure within the equalizer tank. This pressure governs the indications of altimeter 114 and vertical speed indicator 110, the higher the pressure the lower the indicated altitude, an increasing pressure causing the vertical speed indicator to register the rate of descent and a decreasing pressure causing it to register the rate of climb. These two instruments will, therefore, respond to changes in attitude and throttle setting in the same manner that the corresponding instruments in a plane in flight would respond to such changes.

When the trainer is first set in operation the pressure within equalizer tank 58 is equal to atmospheric pressure as is the pressure within bellows 34 and port 56 of climb valve 28. The pressure within bellows 40 will become, as explained above, through the action of regulator 26, less than atmospheric by an amount equal to the compression upon spring 64. The student, upon first starting his "flight," will generally attempt to gain altitude. This will be done through an opening of the throttle 118 (that is, pushing it to the left in Fig. 2) as well as through placing the trainer in a climbing position. Both of these movements will, as explained above, open climb valve 28 but will leave dive valve 32 closed.

In the prior art, without the pressure regulators of this invention, the port 50 of climb valve 28 was connected directly to vacuum pump 18, or its equivalent, as described in the same United States Patent 2,099,857. When the pressure within equalizer tank 58 was atmospheric or near atmospheric as in the beginning of the "flight," a great and undesirable differential was present across the ports of climb valve 28 and upon the opening of the climb valve, as explained above, an excessive amount of air rushed from equalizer tank 58 to vacuum pump 18.

This condition of excessive rate of flow and instrument activity prevailed for a certain length of time until, when the approximate proper pressure differential across the ports of the climb valve was present, the rate of flow and instrument indications were appropriate. Then, however, the pressure differential became too low and the rate of flow and indications of the instruments were gradually lessened until the pressure in the equalizer tank 58 was equal to that of the vacuum pump 18. At this point the "absolute ceiling" of the trainer was reached.

Such a functioning of the vertical speed indicator and altimeter in the trainer came far from simulating the functioning of the same instruments in a plane. In a real plane these instruments would show, with a given attitude and throttle setting, a more or less steady climb until the service ceiling was reached, then a sharp decrease in the rate of climb until the absolute ceiling was reached. This is in sharp contrast to the rate of climb as shown by the vertical speed indicator and altimeter in the trainers of the prior art.

On the other hand, with the regulator 26 interposed between climb valve 28 and vacuum pump 18, with atmospheric or near atmospheric pressure prevailing in equalizer tank 58, when climb valve 28 is opened the flow of air from equalizer tank 58 is no greater than if the pressure in tank 58 were much less i. e., if the trainer were at a much higher assumed altitude. The flow of air through climb valve 28 at any time that climb valve 28 may be opened is independent of the differential between tank 58 and vacuum pump 18 (and therefore, is independent of the assumed trainer altitude), until the pressure within tank 58 becomes so low that it does not exceed the pressure within vacuum pump 18 by an amount equal to the compression of spring 64. Hence, up to this point the steady climb of a plane resulting from a given throttle setting and attitude will be reflected by the altimeter and vertical speed indicator. At this point the "service ceiling" of the trainer is reached. When the differential across the ports 56 and 50 of the climb valve becomes less than the compression of the spring 64, the indications of the vertical speed indicator and altimeter will show that the assumed rate of climb of the trainer is increasingly less until the pressure within equalizer tank 58 is equal to that of vacuum pump 18. The "absolute ceiling" of the trainer is then reached. This slower change in the instruments after the "service ceiling" of the trainer is reached simulates closely the reaction of the same instruments in a real plane after the service ceiling of the plane is reached.

Considering now the functioning of dive regulator 30, regardless of how great the assumed altitude of the trainer becomes, and, therefore, regardless of how low the pressure within equalizer tank 58 becomes, dive regulator 30 limits the differential across the dive valve ports 70 and 82 to an amount equal to the compression upon spring 66. If the dive regulator 30 were not provided, port 70 would communicate directly with the atmosphere, as shown in United States Patent 2,099,857, and the differential at any given time across the ports 70 and 82 of dive valve 32 would be equal to the amount that the pressure within equalizer tank 58 is less than atmospheric. Consequently, if the trainer was flying at a high assumed altitude, when dive valve 32 was opened an excessive amount of air rushed into equalizer tank 58. Vertical speed indicator 110 showed an assumed rate of descent far in excess of the actual performance of a real plane under the conditions being simulated, altimeter 114 reacting in the same manner. In this case, also, damage to the instruments was probable. As the atmosphere within tank 58 became increased the rate of flow thereinto whenever dive valve 32 was open became increasingly less, until the pressure within the tank was equal to atmospheric. For a relatively short while only the rate of change of pressure within equalizer tank 58 was such that the vertical speed indicator 110 and altimeter 114 responded in a manner similar to the response of the same instruments in a plane in flight under the conditions being simulated.

But with the means disclosed herein, regardless of how much less than atmospheric the pressure within equalizer tank 58 becomes, and, therefore, regardless of how high is the assumed altitude of the trainer, the differential across the ports 70 and 82 of dive valve 32 is equal to the compression upon spring 66. The flow of air from bellows 68 into equalizer tank 58 whenever dive valve 32 is open will be independent of the pressure within tank 58. Therefore the reaction of altimeter 114 and vertical speed indicator 110 will closely follow the reactions of the same instruments in a plane in flight.

As stated earlier in this description, relief valve 19 always allows a pressure in tube 79 and port 78 of regulator 30 slightly above the sum of the prevailing atmospheric pressure and the compression of spring 66. This being so, even though the pressure within equalizer tank 58 be nearly atmospheric, the pressure within bellows 68 will be greater than the pressure within the equalizer tank 58 by an amount equal to the compression of spring 66. This desired differential will remain until the pressure within tank 58 is equal to atmospheric.

With my invention, before a "flight" in the trainer the lowest assumed altitude at which the trainer will "fly" during that "flight" is determined. Pump 18 is then turned on and immediately there is across the climb and dive valves a pressure differential equal to the compression of springs 64 and 66, respectively. The altimeter 114 is then set to the mentioned lowest assumed altitude and the trainer is then "flown" till the altimeter indicates the assumed altitude of the beginning of the "flight." Thereafter, throughout the whole "flight," unless the "service ceiling" of the trainer be exceeded, a differential pressure equal to the compression of the two springs will be maintained across their respective valves.

A bleed hole 164 is provided in relief valve 19, this bleed hole at all times being in communication with tube 79. With this provision when the vacuum pump 18 is shut off, if the dive valve 28 be left open the pressure within equalizer tank 58 will become atmospheric.

It will be realized, therefore, that with the means disclosed by the preceding description and accompanying drawing, the altimeter and vertical speed indicator in a grounded trainer may be made to respond to a change in throttle setting as well as in the attitude of the trainer in a manner closely approximating the response of the same instruments in a plane in actual flight to the same movements. However, the preceding disclosure is a preferred embodiment only of this invention which may be readily changed in many respects without departing from the spirit and scope thereof. Therefore, I limit myself only by the following claims when construed in view of the prior art.

I claim:

1. In a grounded aviation trainer for the instruction of student pilots the combination of an equalizer tank having a controlled variable pressure potential, a source of lower pressure connected with said tank, a valve interposed between said tank and said source of lower pressure, and means associated with said valve, and operable within predetermined limits, for causing a uniform flow from said equalizer tank to said source of lower pressure for a given valve opening regardless of the pressure differential between said tank and said source of lower pressure.

2. In a grounded aviation trainer for the instruction of student pilots, the combination of an equalizer tank having a controlled variable pressure potential, an instrument for indicating assumed altitude changes connected to said tank, said instrument being responsive to the pressure within said tank, a source of lower air pressure connected with said tank, a valve interposed between said tank and said source of lower air pressure, and means associated with said valve, and operable within predetermined limits, for causing a uniform flow from said tank to said source of lower air pressure for a given valve opening regardless of the pressure differential between said tank and said source of lower air pressure.

3. In a grounded aviation trainer for the instruction of student pilots the combination of an equalizer tank having a controlled variable pressure potential, an instrument for indicating assumed altitude changes connected to said tank, said instrument being responsive to the pressure within said tank, a source of lower pressure connected with said tank, a valve interposed between said equalizer tank and said source of lower pressure, and means associated with said valve, and operable within predetermined limits, for causing a uniform flow from said equalizer tank to said source of lower pressure for a given valve opening regardless of the pressure differential therebetween, and within other predetermined limits a flow dependent upon the pressure differential between said tank and said source of lower pressure.

4. In a grounded aviation trainer for the instruction of student pilots the combination of a throttle, an equalizer tank having a controlled variable pressure potential, an instrument for indicating assumed altitude changes connected to said tank, said instrument being responsive to the pressure within said tank, a source of lower pressure connected with said tank, a valve interposed between said tank and said source of lower pressure, said valve being responsive to the setting of said throttle, and means associated with said valve, and operable within predetermined limits, for causing a uniform flow from said equalizer tank to said source of lower pressure for a given valve opening regardless of the pressure differential between said tank and said source of lower pressure.

5. In a grounded aviation trainer having a fuselage capable of pitching in simulation of the climbing and diving of a plane in actual flight, the combination of an equalizer tank having a controlled variable pressure potential, an instrument for indicating assumed altitude changes connected to said tank, said instrument being responsive to the pressure within said tank, a source of lower pressure connected with said tank, a valve interposed between said tank and said source of lower pressure, said valve being responsive to the pitching of said fuselage, and means associated with said valve, and operable within predetermined limits, for causing a uniform flow from said equalizer tank to said source of lower pressure for a given valve opening regardless of the pressure differential between said tank and said source of lower pressure.

6. In a grounded aviation trainer having a fuselage capable of pitching in simulation of the climbing and diving of a plane in actual flight, the combination of a throttle, an equalizer tank having a controlled variable pressure potential, an instrument for indicating assumed altitude changes connected to said tank, said instrument being responsive to the pressure within said tank, a source of lower pressure connected with said tank, a valve interposed between said tank and said source of lower pressure, said valve being responsive to the pitching of said fuselage as well as to the setting of said throttle, and means associated with said valve, and operable within predetermined limits, for causing a uniform flow from said equalizer tank to said source of lower pressure for a given valve opening regardless of the pressure differential between said tank and said source of lower pressure.

7. In a grounded aviation trainer for the instruction of student pilots the combination of an equalizer tank having a controlled variable pressure potential, an instrument for indicating assumed altitude changes connected to said tank, said instrument being responsive to the pressure within said tank, a source of higher pressure connected with said tank, a valve interposed between said tank and said source of higher pressure, and means associated with said valve for causing a uniform flow from said source of higher pressure to said tank for a given valve opening regardless of the pressure differential between said source of higher pressure and said equalizer tank.

8. In a grounded aviation trainer for the instruction of student pilots, the combination of an equalizer tank having a controlled variable pressure potential, an instrument for indicating assumed altitude changes connected to said tank, said instrument being responsive to the pressure within said tank, a source of higher air pressure connected with said tank, a valve interposed between said tank and said source of higher air pressure, and means associated with said valve for causing a uniform flow from said source of higher air pressure to said tank for a given valve opening regardless of the pressure differential between said source of higher air pressure and said equalizer tank.

9. In a grounded aviation trainer for the instruction of student pilots, the combination of a throttle, an equalizer tank having a controlled variable pressure potential, an instrument for indicating assumed altitude changes connected to said tank, said instrument being responsive to the pressure within said tank, a source of higher pressure connected with said tank, a valve interposed between said tank and said source of higher pressure, said valve being responsive to the setting of said throttle, and means associated with said valve for causing a uniform flow from said source of higher pressure to said equalizer tank for a given valve opening regardless of the pressure differential between said tank and said source of higher pressure.

10. In a grounded aviation trainer having a fuselage capable of pitching in simulation of the climbing and diving of a plane in actual flight the combination of an equalizer tank having a controlled variable pressure potential, an instrument for indicating assumed altitude changes connected to said tank, said instrument being responsive to the pressure within said tank, a source of higher pressure connected with said tank, a valve interposed between said tank and said source of higher pressure, said valve being responsive to the pitching of said fuselage, and means associated with said valve for causing a uniform flow from said source of higher pressure to said equalizer tank for a given valve opening regardless of the pressure differential between said tank and said source of higher pressure.

11. In a grounded aviation trainer having a fuselage capable of pitching in simulation of the climbing and diving of a plane in actual flight, the combination of a throttle, an equalizer tank having a controlled variable pressure potential, an instrument for indicating assumed altitude changes connected to said tank, said instrument being responsive to the pressure within said tank, a source of higher pressure connected with said tank, a valve interposed between said tank and said source of higher pressure, said valve being responsive to the pitching of said fuselage as well as to the setting of said throttle, and means associated with said valve for causing a uniform flow from said source of higher pressure to said equalizer tank for a given valve opening regardless of the pressure differential therebetween.

12. In a grounded aviation trainer for the instruction of student pilots the combination of an equalizer tank having a controlled variable pressure potential, an instrument for indicating assumed altitude changes connected to said tank, said instrument being responsive to the pressure within said tank, a source of pressure connected with said tank, said source of pressure having a potential normally different from the pressure within said tank, a valve interposed between said tank and said source of pressure, and means associated with said valve, and operable within predetermined limits, for causing a uniform flow through said valve for a given valve opening regardless of the difference in the pressures within said pressure containing members.

13. In a grounded aviation trainer for the instruction of student pilots the combination of an equalizer tank having a controlled variable pressure potential, an instrument connected to said tank, said instrument being responsive to the pressure within said tank, a source of lower air pressure connected with said tank, a valve interposed between said tank and said source of lower air pressure, and means associated with said valve for causing a uniform flow from said equalizer tank to said source of lower air pressure for a given valve opening regardless of the pressure differential therebetween.

14. In a grounded aviation trainer for the instruction of student pilots, the combination of an equalizer tank having a controlled variable pressure potential, a source of lower air pressure connected with said tank, a valve interposed between said tank and said source of lower air pressure, and means associated with said valve, and operable within predetermined limits, for causing a uniform flow from said equalizer tank to said source of lower air pressure for a given valve opening regardless of the pressure differential between said tank and said source of lower air pressure, and within other predetermined limits a flow dependent upon the pressure differential between said equalizer tank and said source of lower air pressure.

15. In a grounded aviation trainer for the instruction of student pilots the combination of an equalizer tank having a controlled variable pressure potential, a source of normally higher air pressure connected with said tank, a valve interposed between said tank and said source of higher air pressure, and means associated with said valve, and operable within predetermined limits, for causing a uniform flow from said source of higher air pressure to said tank for a given valve opening regardless of the pressure differential therebetween.

16. In a grounded aviation trainer for the instruction of student pilots the combination of an equalizer tank having a controlled variable pressure potential, an instrument connected to said tank, said instrument being responsive to the pressure within said tank, a source of higher air pressure connected to said tank, a valve interposed between said tank and said source of higher air pressure, and means associated with said valve, and operable within predetermined limits, for causing a uniform flow from said source of higher air pressure to said tank for a given valve opening regardless of the pressure differential between said source of higher air pressure and said equalizer tank.

17. In a grounded aviation trainer for the instruction of student pilots the combination of an equalizer tank having a controlled variable pressure potential, a source of lower pressure and a source of higher pressure, each of said sources being connected with said tank, a valve interposed between said equalizer tank and said source of lower pressure and a valve interposed between said equalizer tank and said source of higher pressure, and means associated with each of said valves, and operable within predetermined limits, for causing a uniform flow through each of said valves for a given valve opening regardless of the pressure differential between said tank and each of said sources.

18. In a grounded aviation trainer for the instruction of student pilots the combination of an equalizer tank having a controlled variable pressure potential, an instrument connected to said tank, said instrument being responsive to the pressure within said tank, a source of lower pressure and a source of higher pressure, each of said sources being connected with said tank, a valve interposed between said tank and said source of lower pressure, and a valve interposed between said tank and said source of higher pressure, and means associated with each of said valves, and operable within predetermined limits, for causing a uniform flow through each of said valves for a given valve opening regardless of the pressure differential between said tank and each of said sources.

19. In a grounded aviation trainer for the instruction of student pilots the combination of an equalizer tank having a controlled variable pressure potential, a source of lower air pressure and a source of higher air pressure, each of said sources being connected with said tank, a valve interposed between said tank and said source of lower air pressure and a valve interposed between said tank and said source of higher air pressure, and means associated with each of said valves, and operable within predetermined limits, for causing a uniform flow through each of said valves for a given valve opening regardless of the pressure differential between said tank and each of said sources of pressure, and within other predetermined limits, a flow dependent upon the pressure differential between said tank and each of said sources of air pressure.

20. In a grounded aviation trainer for the instruction of student pilots the combination of a throttle, an equalizer tank having a controlled variable pressure potential, a source of lower pressure and a source of higher pressure, each of said sources being connected with said tank, a valve interposed between said tank and said source of lower pressure, and a valve interposed between said tank and said source of higher pressure, each of said valves being responsive to the setting of said throttle, and means associated with each of said valves, and operable within predetermined limits, for causing a uniform flow through each of said valves for a given valve opening regardless of the pressure differential between said tank and each of said sources.

21. In a grounded aviation trainer having a fuselage capable of pitching in simulation of the climbing and diving of a plane in actual flight the combination of an equalizer tank having a controlled variable pressure potential, a source of lower pressure and a source of higher pressure, each of said sources being connected with said tank, a valve interposed between said tank and said source of lower pressure, and a valve interposed between said tank and said source of higher pressure, each of said valves being responsive to the pitching of said trainer fuselage, and means associated with each of said valves, and operable within predetermined limits, for causing a uniform flow through each of said valves for a given valve opening regardless of the pressure differential between said tank and each of said sources.

22. In a grounded aviation trainer for the instruction of student pilots the combination of an equalizer tank having a controlled variable pressure potential, a source of lower pressure and a source of higher pressure, each of said sources being connected with said tank, a valve interposed between said equalizer tank and said source of lower pressure and a valve interposed between said equalizer tank and said source of higher pressure, and a pressure regulator associated with each of said valves, and operable within predetermined limits, for causing a uniform flow through each of said valves for a given valve opening regardless of the pressure differential between said tank and each of said sources.

23. In a grounded aviation trainer for the instruction of student pilots the combination of an equalizer tank having a controlled variable pressure potential, an instrument connected with and being responsive to the pressure within said tank, a source of lower pressure and a source of higher pressure, each of said sources being connected with said tank, a valve interposed between said tank and said source of lower pressure, and a valve interposed between said tank and said source of higher pressure, and a pressure regulator associated with each of said valves, and operable within predetermined limits, for causing a uniform flow through each of said valves for a given valve opening regardless of the pressure differential between said tank and each of said sources.

24. In a grounded aviation trainer for the instruction of student pilots the combination of a throttle, an equalizer tank having a controlled variable pressure potential, a source of lower pressure and a source of higher pressure, each of said sources being connected with said tank, a valve interposed between said tank and said source of lower pressure, and a valve interposed between said tank and said source of higher pressure, each of said valves being responsive to the setting of said throttle, and a pressure regulator associated with each of said valves, and operable within predetermined limits, for causing a uniform flow through each of said valves for a given valve opening regardless of the pressure differential between said tank and each of said sources.

25. In a grounded aviation trainer having a fuselage capable of pitching in simulation of the climbing and diving of a plane in actual flight the combination of an equalizer tank having a controlled variable pressure potential, a source of lower pressure and a source of higher pressure, each of said sources being connected with said tank, a valve interposed between said tank and each of said sources, each of said valves being responsive to the pitching of said trainer fuselage, and a pressure regulator associated with each of said valves, and operable within predetermined limits, for causing a uniform flow through each of said valves for a given valve opening, regardless of the pressure differential between said tank and each of said sources.

26. In a grounded aviation trainer for the instruction of student pilots the combination of an equalizer tank having a controlled variable pressure potential, a source of lower air pressure, a valve having one port connected to said tank, a pressure regulator between the second port of said valve and said source of lower air pressure, said pressure regulator comprising a three-port valve, one of said ports being connected to the second port of said first-mentioned valve, the second of said ports being connected to said source of lower air pressure and the last of said ports being in communication with the atmosphere, and pressure-responsive means for placing the first-mentioned port of said three-port valve in communication with either of the other two ports in order to maintain the desired pressure differential across the ports of said first-mentioned valve.

27. In a grounded aviation trainer for the instruction of student pilots the combination of an equalizer tank having a controlled variable pressure potential, a source of lower pressure and a source of normally higher pressure, a valve having one port connected to said tank, and a pressure regulator between the second port of said valve and said source of normally higher pressure, said pressure regulator comprising a three-port valve, one of said ports being connected to the second port of said first-mentioned valve, the second of said ports being connected to said source of lower pressure, and the last of said ports being connected to said source of normally higher pressure, and pressure-responsive means for placing the first-mentioned port of said three-port valve in communication with either of the other two ports in order to maintain the desired pressure differential across the ports of said first-mentioned valve.

28. In a grounded aviation trainer for the instruction of student pilots the combination of an equalizer tank having a controlled variable pressure potential, a three-port slide valve, a pair of collapsible bellows each having its movable end attached to the opposite ends of the slide of said slide valve, one of said bellows being in communication with said equalizer tank, a spring of predetermined strength interposed between the movable end of said bellows and the housing of said valve, one of the ports of said three-port valve being in communication with said other bellows, the second of said ports being in communication with a source of lower pressure, and the last of said ports being in communication with the atmosphere, the relative pressures within said bellows and the strength of said spring determining with which, if either, of said last two ports said first-mentioned port is in communication.

29. In a grounded aviation trainer for the instruction of student pilots the combination of an equalizer tank having a controlled variable pressure potential, a three-port slide valve, a pair of collapsible bellows each having its movable end attached to the opposite ends of the slide of said slide valve, one of said bellows being in communication with said equalizer tank, a spring of predetermined strength interposed between the movable end of said other bellows and the housing of said valve, one of the ports of said three-port valve being in communication with said last-mentioned bellows, the second of said ports being in communication with a source of lower pressure, and the last of said ports being in communication with a source of pressure normally higher than that within said tank, the relative pressures within said bellows and the strength of said spring determining with which, if either, of said last two ports said first-mentioned port is in communication.

30. In a grounded aviation trainer for the instruction of student pilots the combination of an equalizer tank having a controlled variable pressure potential, a source of higher pressure connected with said equalizer tank, a valve interposed between said tank and said source of higher pressure, and a bleed hole associated with said pressure source for allowing atmosphere to enter said tank when said pressure source is interrupted and said valve is open.

GUNNE LOWKRANTZ.